Dec. 17, 1968  M. T. FARQUHAR  3,416,653
CONTAINER MEANS AND METHOD OF MAKING SAME AND BLANKS FOR
MAKING SUCH CONTAINER MEANS
Filed Nov. 21, 1966  8 Sheets-Sheet 1

INVENTOR
MELVILLE T. FARQUHAR

BY
HIS ATTORNEYS

Dec. 17, 1968 M. T. FARQUHAR 3,416,653
CONTAINER MEANS AND METHOD OF MAKING SAME AND BLANKS FOR
MAKING SUCH CONTAINER MEANS
Filed Nov. 21, 1966 8 Sheets-Sheet 7

INVENTOR
MELVILLE T. FARQUHAR

BY

HIS ATTORNEYS

United States Patent Office

3,416,653
Patented Dec. 17, 1968

3,416,653
CONTAINER MEANS AND METHOD OF MAKING SAME AND BLANKS FOR MAKING SUCH CONTAINER MEANS
Melville T. Farquhar, Bon Air, Va., assignor to Reynolds Metals Company, Richmond, Va., a corporation of Delaware
Filed Nov. 21, 1966, Ser. No. 595,697
17 Claims. (Cl. 206—65)

ABSTRACT OF THE DISCLOSURE

This disclosure relates to improved partitioned container means having a central vertical partition extending the full length thereof and having a plurality of transverse partition means extending transverse to such central partition in spaced apart relation and supported solely by such central partition, to an improved method wherein a simple suitably cut and scored carton having the general shape of a parallelepiped is folded in a predetermined series of steps to provide such improved partitioned container means, and to blanks for making such improved container means.

---

This invention relates to container means and more particularly to an improved partitioned container means and a method of making same and to blanks for making such container means.

Many partitioned container means in current use today, such as partitioned carriers for bottles of beverage, for example, utilize a plurality of separate partitions or partitions which are fastened along opposite edges thereof in order to hold them in position between the bottles carried within the particular carrier. Such present carriers are comparatively complicated to make and assemble thereby increasing the overall cost thereof.

Accordingly, it is a feature of this invention to provide an improved partitioned container means which is of simple and economical construction and which is easy to assemble and use.

Another feature of this invention is to provide an improved partitioned container means for carrying a plurality of articles which utilizes a central vertical partition extending the full length thereof and a plurality of partitions extending transverse to while being supported solely by such central vertical partition.

Another feature of this invention is to provide an improved partitioned container means of the character mentioned made from a single sheet of foldable material and particularly adapted from carrying six articles therewithin and which does not require separate partition means to isolate such articles from each other.

Another feature of this invention is to provide an improved partitioned container means of the character mentioned for more than six articles and made from a single sheet of foldable material and which utilizes a single piece easily installed substantially U-shaped additional partition means to separate certain ones of such articles from each other.

Another feature of this invention is to provide an improved method of making partitioned container means simply, economically, and without requiring special equipment.

Another feature of this invention is to provide an improved method of making improved partitioned container means utilizing an inexpensive suitably cut and scored carton having the general shape of a parallelepiped wherein such partitioned container means is defined merely by folding portions of such carton in a predetermined manner.

Another feature of this invention is to provide an improved method of making a partitioned carton having improved partitions which are held in position without requiring separate fastening means.

Another feature of this invention is to provide an improved method of making such partitioned container means having a plurality of equal size compartment means particularly adapted for use in carrying beverage containers therewithin.

Another feature of this invention is to provide an improved partitioned container means and method of making such container means which utilizes overwrapping means overwrapped around such container means and articles carrried therewithin to provide an improved inexpensive package.

Therefore, it is an object of this invention to provide an improved partitioned container means and an improved method of making such partitioned container means having one or more of the novel features of this invention as set forth above or hereinafter shown or described.

Another object of this invention is to provide improved blanks for making such improved partitioned container means, or the like.

Other objects, uses, and advantages of this invention are apparent from a reading of this description which proceeds with reference to the accompanying drawings forming a part thereof and wherein:

FIGURE 1 is a view similar to FIGURE 3 illustrating a suitably cut and scored carton used to make the partitioned container means of FIGURE 9.

While the various features of this invention are hereinafter illustrated and described as being particularly adapted for providing partitioned container means and an improved method of making such partitioned container means such as container means for carrying bottles of beverage, or the like, it is to be understood that the various features of this invention can be utilized singly or in any combination thereof to provide improved partitioned container means for other articles, as desired. Therefore, this invention is not to be limited to only the embodiments illustrated in the drawings because the drawings are merely utilized to illustrate one of the wide variety of uses of this invention.

Figure 6:
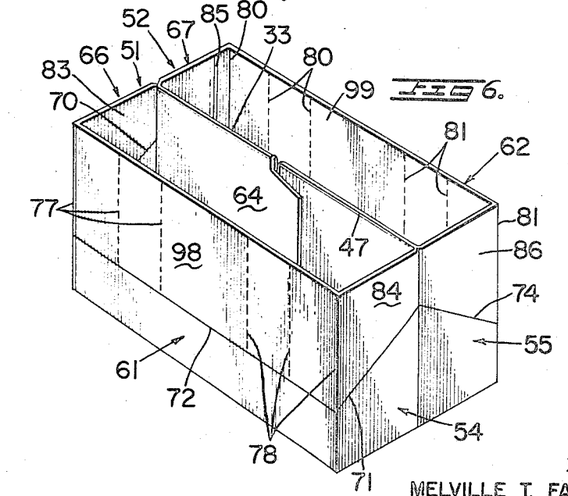
FIGURE 6 is a perspective view illustrating the carton of FIGURE 5 completely folded to define a pair of tubular units having open top wall means wherein such tubular units are foldably connected to define a central partition extending therebetween the full length thereof.
Figure 7:
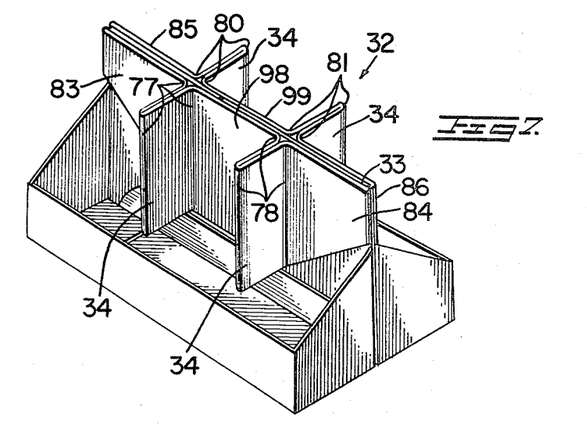
FIGURE 7 is a perspective view of the carton of FIGURE 6 folded about suitable cut and score means therein to define a plurality of integral partitions extending from opposite sides of the central partition.
Figure 8:
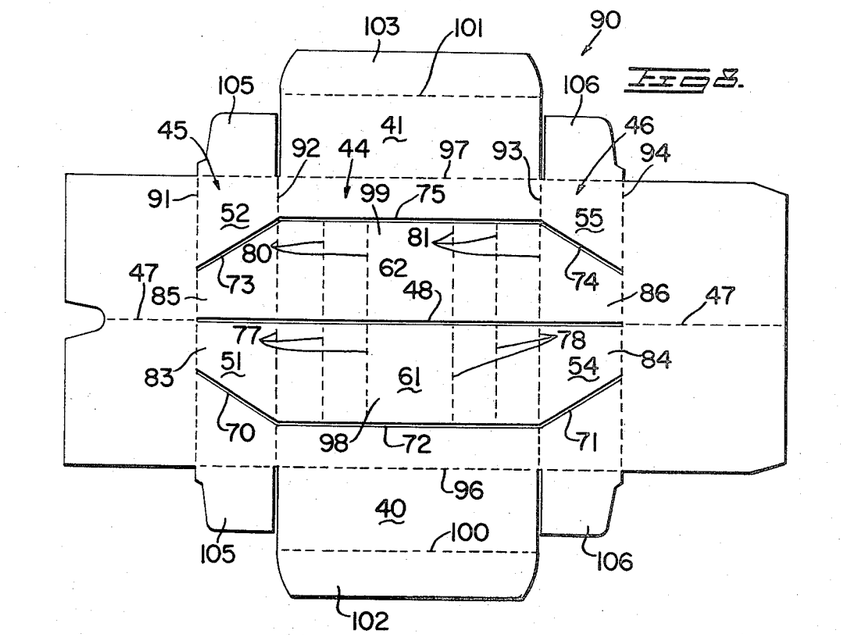
FIGURE 8 is a plan view of the blank used to make the carton of FIGURE 3.

In the exemplary embodiment of this invention illustrated in FIGURES 1–8 of the drawings, an improved container means such as a bottle carrier 30 is illustrated, as well as an improved blank, shown in FIGURE 8, for making the interior partitioned portion of carrier 30. Carrier 30 in this example of the invention is particularly adapted fo carrying a plurality of six identical bottle, such as beverage, a representative few of which have been designated by the numeral 31. Carrier 30 comprises partitioned container means or a partitioned carton designated generally by the numeral 32 which supports bottles 31 therewithin and overwrapping means shown as a transparent plastic outer covering 36 which has been wrapped and preferably shrunk about carton 32 with bottles 31 supported therewithin.

Figure 1:
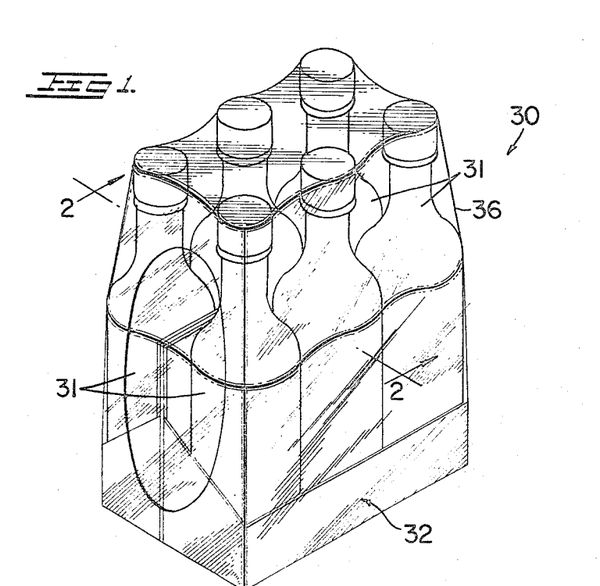
FIGURE 1 is a perspective view illustrating one exemplary embodiment of the partitioned container means of this invention used to carry six bottles of beverage.
Figure 2:
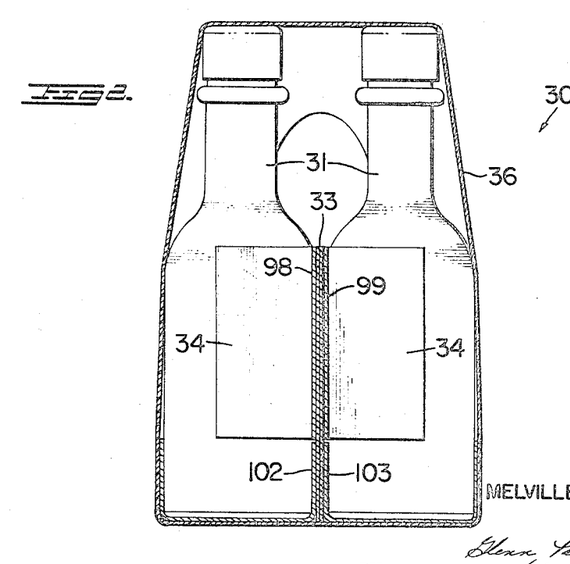
FIGURE 2 is a sectional view on the line 2—2 of FIGURE 1.

As seen particularly in FIGURES 1 and 7 of the drawings, container means or carton 32 has a central vertical partition designated generally by the numeral 33 which extends the full length thereof. Central partition 33 has transverse partition means such as a plurality of transverse partitions each designated by the numeral 34 extending transverse to such central partition in spaced apart relation and so that a plurality of six compartment means or compartments are defined within carton 32 to support bottles 31 therewithin in such a manner that their vertical walls do not contact each other and are supported or cushioned against partitions 34 and central partition 33.

Container means or partitioned carton 32 is preferably formed from a single sheet of foldable material such as the blank illustrated in FIGURE 8 and which will be described in detail subsequently. The blank of FIGURE 8 is folded and suitably fastened along the side edge thereof to define a tubular structure having open ends and having extension flap means extending beyond each open end and including end wall means designated by the numerals 40 and 41 in FIGURE 3 of the drawings. End wall means 40 and 41 are folded into position as illustrated in FIGURE 4 so that initially carton 32 has the general shape of a parallelepiped.

Figure 4:
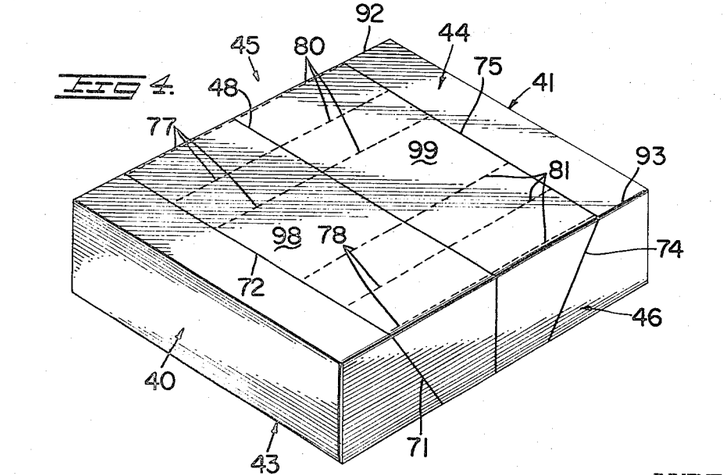
FIGURE 4 is a perspective view illustrating the carton of FIGURE 3 with its end wall means closed and prior to beginning a series of folding steps to define the partitioned container means shown in FIGURE 1.

In addition to its end walls 40 and 41, carton 32, in its initial configuration of FIGURE 4, has a bottom wall 43, a top wall 44, and a pair of parallel spaced apart side walls 45 and 46 arranged at opposite sides thereof. A score or fold line 47 is provided across the central portion of bottom wall 43 essentially dividing such bottom wall in two equal parts.

Carton 32 as illustrated in FIGURE 4 has suitable cut means or a cut 48 provided therein and extending across the full width of tap wall 44 as well as completely across side walls 45 and 46 at each side and is defined by a cutting plane extending outwardly from the perpendicular to bottom wall 43 with score line 47 coinciding with the edge of such plane. Cut 48 enables carton 32, as shown in FIGURE 4, to be folded substantially in half about fold line 47 as shown in FIGURE 5.

Score line 47 and cut 48, in effect, divide each exterior wall, except walls 40 and 41, of carton 32 into two equal area portions, and such portions of each wall have been designated by different numerals for ease of description. Thus, side wall 45 is comprised of rectangular portions 51 and 52, side wall 46 is comprised of portions 54 and 55, top wall 44 is comprised of portions 61 and 62, and bottom wall 43 is comprised of portions 64 and 65.

Figure 5:
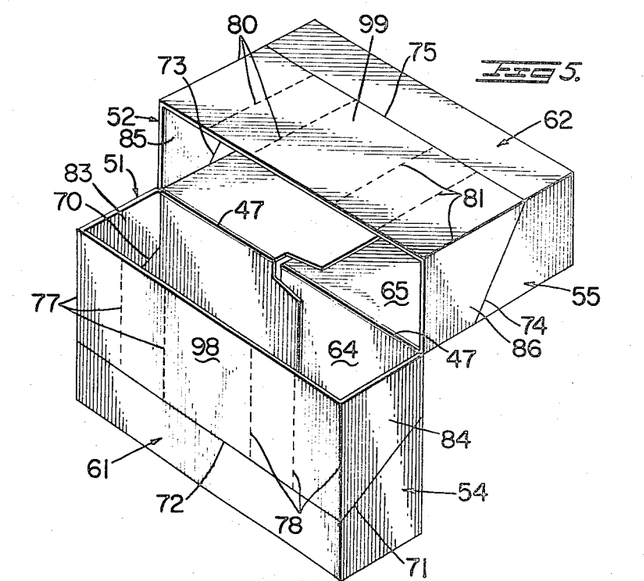
FIGURE 5 is a perspective view illustrating the first of a series of such folding steps showing the manner of folding the carton of FIGURE 4 about a central fold line in one of its wall.

Upon folding carton 32 about score line 47 as shown in FIGURE 5 to define the configuration illustrated in FIGURE 6 a pair of adjoining tubular units designated by the numerals 66 and 67 is provided. Tubular units 66 and 67 have open top wall means or an open top and a central double thickness vertical partition arranged therebetween which defines a common wall for both units and which has been previously designated by the numeral 33. Partition 33 has score or fold line 47 defining its top edge and is comprised of wall portions 64 and 65 of bottom wall 43.

Suitable cut and score means is provided in wall means of tubular units 66 and 67 and such cut and score means are of an identical nature and symmetrically provided with respect to the central vertical partition 33 which extends completely across carton 32.

The cut means comprises a pair of downwardly inclined symmetrically arranged cuts 70 and 71 provided in wall portions 51 and 54 respectively and commencing from the same vertical position on central partition 33. Each cut 70 and 71 extends completely across its associated wall portion. Another cut 72 is provided in wall portion 61 and such cut extends between the terminal ends of cuts 70 and 71 across the full length of wall portion 61.

In a similar manner, wall portions 52 and 55 have identical symmetrically arranged downwardly inclined cuts 73 and 74 provided therein. Cuts 73 and 74 commence from the same vertical position on central partition 33 as cuts 70 and 71 and each extends completely across its associated wall portion. A horizontal cut designated by the numeral 75 is provided extending between the outer ends of cuts 73 and 74 and completely across wall portion 62 and in a corresponding manner as cut 72 in wall portion 61.

Each wall portion 61 and 62 in this example of the invention has a plurality of sets of spaced apart substantially vertical score lines. Each set of score lines is comprised of three vertical score lines wherein the outer score lines in each set are arranged an equal distance from the central score line for reasons which will be apparent from the description to follow.

As seen in FIGURE 6, wall portion 61 has a set of three vertical score lines each designated by the numeral 77 arranged between cut 72 therein and its top edge at one side thereof and another similar set of three score lines each designated by the numeral 78 arranged between cut 72 and the top edge of such wall portion at its opposite side. The outer score line of each set 77 and 78 also defines the side edge of wall portion 61.

In a similar manner wall portion 62 has a set of three vertical score lines each designated by the numeral 80 arranged between cut 75 therein and its top edge at one side thereof and another similar set of three vertical score lines each designated by the numeral 81 arranged between cut 75 and the top edge of such wall portion at its opposite side. The outer score line of each set 80 and 81 also defines a side edge of wall portion 62.

The tubular units 66 and 67 of carton 32 as illustrated in FIGURE 6 of the drawings are each collapsed inwardly so that parts of wall portions 61 and 62 lie substantially coplanar with the central vertical partition 33 and score lines 77, 78, 80, and 81 enable the forming of double, thickness partitions 34 which extend outwardly from central partition 33 on opposite sides thereof. The resulting partitioned container means is shown in FIGURE 7 and is also designated by the numeral 32.

During the inward folding of tubular unit 66 the upper section designated by the numeral 83 of wall portion 51 is folded so that it lies substantially coplanar with vertical partition 33. Similarly, an upper section 84 of wall portion 54 is arranged so that it lies coplanar with the central vertical partition 33 at the opposite end thereof. During such inward folding wall 61 has a central part arranged coplanar with vertical partition 33 and the portions thereof on either side of central score lines 77 and 78 define the previously mentioned double thickness partitions.

Similarly, at the opposite side of carton 32, an upper section 85 of wall portion 52 is folded substantially coplanar with central partition 33 and an upper end portion 86 of wall portion 55 is also folded coplanar with central partition 33. In a similar manner as described in connection with wall portion 61, the inward folding of wall 62 to form partitions 34 at the opposite side of carton 32 results in a central part of wall portion 62 being arranged coplanar with partition 33 at its opposite side and the portions thereof on either side of central score lines 80 and 81 define the opposite previously mentioned double thickness partitions 34.

Thus, it is seen that a simple inexpensively produced carton having the general shape of a parallelepipe as illustrated in FIGURE 4 of the drawings is folded in a series of sequential steps so as to define the improved partitioned carton also designated by the numeral 32 and illustrated in FIGURE 7 of the drawings.

The carton as illustrated in FIGURE 7 of the drawings has a plurality of six identical containers or bottles 31 placed therewithin and the whole assembly preferably has a transparent plastic overwrapping means or overwrap 36 shrunk in position therearound. Plastic overwrap 36 is provided in tubular form and the assembled partitioned carton 32, as illustrated in FIGURE 7, with bottles 31 placed therewithin is inserted within tubular plastic overwrap 36 and such overwrap is preferably heat shrunk in position around the entire assembly in a known manner to define the improved partitioned container means 30 illustrated in FIGURE 1 of the drawings.

Thus, it is seen that partitioned carrier 30 utilizes a suitably cut and scored carton 32 of simple construction which is simply and easily formed by first folding such carton in half to define a central partition 33 extending the full length of carton 32, then folding portions of such carton, after it has been folded in half, into position to define a plurality of partitions 34 extending from opposite sides of central partition 33 so as to define compartment means for receiving bottles 31. After placing bottles 31 in position plastic overwrap 36 is heat shrunk in position around partitioned container means 32 and bottles 31 to form the inexpensive package 30.

The partition means or partitions 34 provided in partitioned container means 32 extend from opposite sides or vertical surfaces of central vertical portion 33 and are supported solely thereby. Thus, it is not necessary that such partitions be supported, for example, at their outer ends as is generally done in the conventional partitioned carton or carrier of this general type. This construction enables a simple and more economical assembly operation which results in the provision of a partitioned carton which is comparatively inexpensive to produce and may be easily and readily erected.

The partitions 34 illustrated and described in connection with the embodiment of this invention illustrated in FIGURES 1 and 7 in the drawings shows such partitions extending outwardly substantially from the upper end portions of central vertical partition 33. However, it will be appreciated that such partitions may extend from the full height of such central vertical partition 33 or such partitions may extend from the lower end portion of such central vertical partition 33 in some applications of this invention, as desired. The preferred construction is to provide partitions 34 extending from the upper end portion of central vertical partition 33, as illustrated, so that the lower part of partitioned carton 32 provides added rigidity and support for bottles 31 carried therewithin.

Partitioned carton 32 used in carrier 30 of this exemplary embodiment of the invention can be formed in any suitable manner and made from any suitable material. It is preferably formed from the blank 90, illustrated in FIGURE 8 of the drawings. Blank 90 is made of cardboard, or the like, having a side such as the exposed surface thereof laminated with metallic foil, such as aluminum-containing metallic foil, or the like, suitably colored, embossed, imprinted, or remaining plain as desired.

Blank 90 is suitably cut and scored and includes a series of parallel spaced apart rectilinear score or fold lines 91, 92, 93, and 94 defining one dimension of a portion of bottom wall 43 extending outwardly beyond score line 91, side wall 45 extending between score lines 91 and 92, top wall 44 extending between score lines 92 and 93, side wall 46 extending between score lines 93 and 94, and a portion of bottom wall 43 extending outwardly beyond score line 94. A pair of parallel spaced apart score lines 96 and 97 define the transverse dimension of walls 43, 44, 45, and 46.

Figure 3:
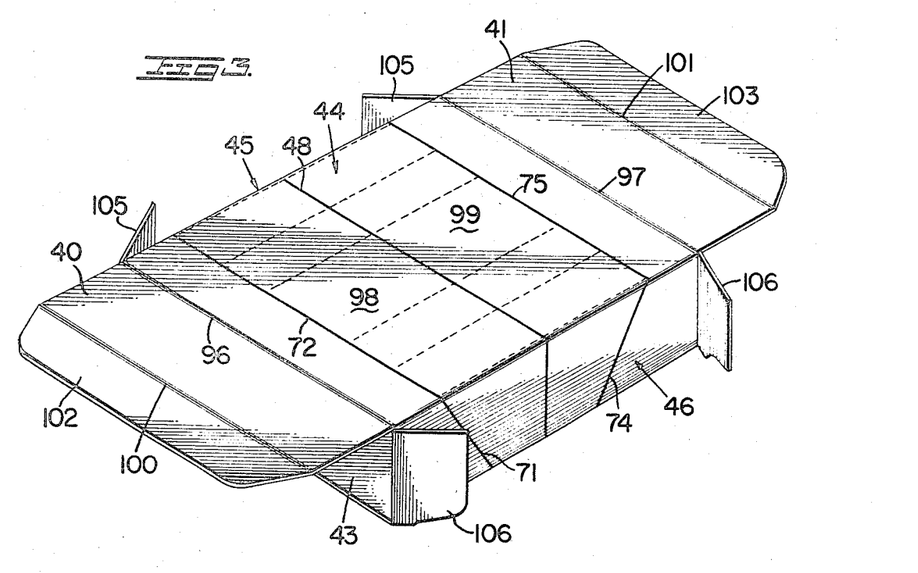
FIGURE 3 is a perspective view illustrating a suitably cut and scored carton used to make the partitioned container means of FIGURE 1 and showing such carton prior to closing end wall means thereof.

Blank 90 is folded about its score lines 91-93 and the terminal outer ends of such blank spaced outwardly from score lines 91 and 94 are suitably fastened together to define bottom wall 43 and the essentially tubular structure shown in FIGURE 3. Any suitable fastening means may be employed; however, suitable adhesive means such as glue, or the like, is preferred.

End walls 40 and 41 of carton 32, as seen in FIGURE 4, are defined in blank 90 so that they extend outwardly beyond score lines 96 and 97 respectively. End walls 40 and 41 have score lines 100 and 101 respectively defining their terminal outer edges and extending parallel to their respective score lines 96 and 97.

A closure flap 102 extends beyond score line 100 in end wall 40 and a similar closure flap 103 extends beyond score line 101. Closure flaps 102 and 103 are inserted in position after assembling blank 90 to define the tubular structure shown in FIGURE 4.

Each side wall 45 and 46 has a pair of identical back-up flaps or tabs extending from its opposite ends. The tabs extending from opposite ends of side wall 45 are each designated by the numeral 105. Similarly, the tabs extending from opposite ends of side wall 46 are each designated by the numeral 106. Tabs 105 and 106 are adapted to be folded in position in the assembled carton and end walls 40 and 41 are folded in position thereagainst.

Blank 90 has a centrally arranged rectilinear cut designated by the numeral 48 which extends completely across top wall 44 and side walls 45 and 46. Also, bottom wall 44 is essentially bisected by score line 47. Thus, it is seen that upon assemblying blank 90 to define the carton having the general configuration of a parallelepiped illustrated in FIGURE 4, cut 48 and score line 47 enable such carton ot be folded essentially in half to define tubular units 66 and 67 of FIGURE 6.

Side wall 45 is comprised of two equal area portions 51 and 52. Side wall 46 is also comprised of two equal area portions 54 and 55. Each side wall portion has a cut extending completely thereacross as will be presently described and such cuts are used to help define partition means.

Rectilinear cut 70 is provided in portion 51 so that it extends completely across portion 51 of side wall 45 defining section 83 of wall portion 51 and a similar cut 71 is provided in portion 54 defining section 84 thereof. The terminal outer ends of cuts 70 and 71 are interconnected by cut 72 extending across wall portion 61 of top wall 44.

Wall portion 52 has a cut 73 provided therein defining wall section 85 thereof while wall portion 55 has a symmetrically arranged identical cut 74 provided therein defining section 86 thereof. Cuts 73 and 74 are interconnected at their outer terminal ends by an elongated rectilinear cut 75 extending completely across wall portion 62 of top wall 44.

Wall portion 61 has a set of three parallel score means or score lines provided therein adjacent one of its side edges and each designated by the numeral 77 and another set of three parallel score lines provided adjacent its opposite side edge and each designated by the numeral 78. Wall portion 62 also has two sets of three spaced apart parallel score lines adjacent its corresponding side edges. Each score line in one set is designated by the numeral 80 and each score line in the opposite set is designated by the numeral 81.

Upon assemblying blank 90 to define the partitioned carton as illustrated in FIGURE 7 of the drawings, sections 83 and 84 respectively are folded so that they lie coplanar with the central partition 33 along one side thereof and portions 85 and 86 are arranged so that they also lie coplanar with vertical partition 33 on the opposite side thereof. Score lines 77, 78, 80 and 81 enable the outer parts of wall portions 61 and 62 to be folded to define the double thickness partitions 34 while central parts 98 and 99 of wall portions 61 and 62 respectively are positioned coplanar with their associated sides of vertical partition 33.

Figure 9:
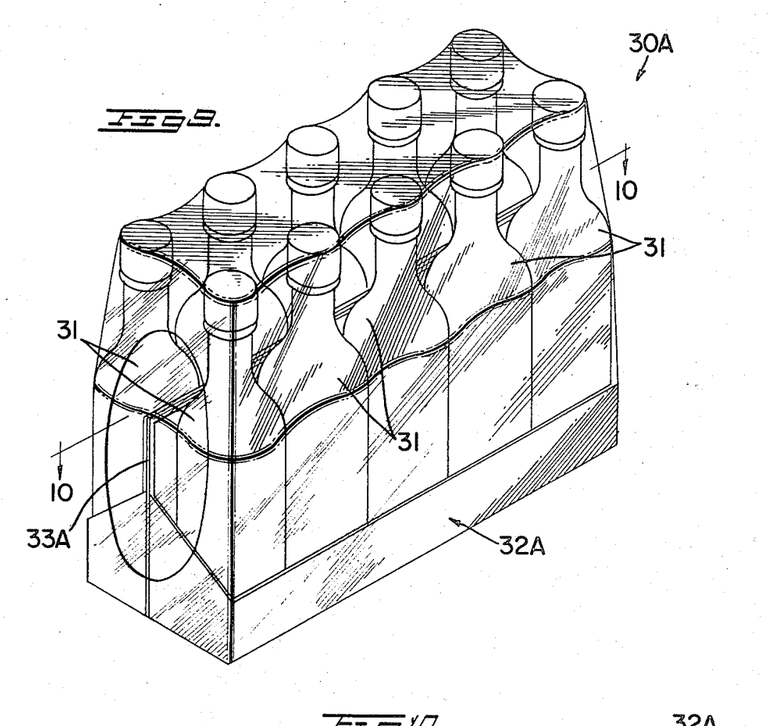
FIGURE 9 is a perspective view illustrating another exemplary embodiment of the partitioned container means of this invention which utilizes a single piece insert having additional partitions extending therefrom to enable carrying a plurality of ten bottles of beverage within such container means.
Figure 10:
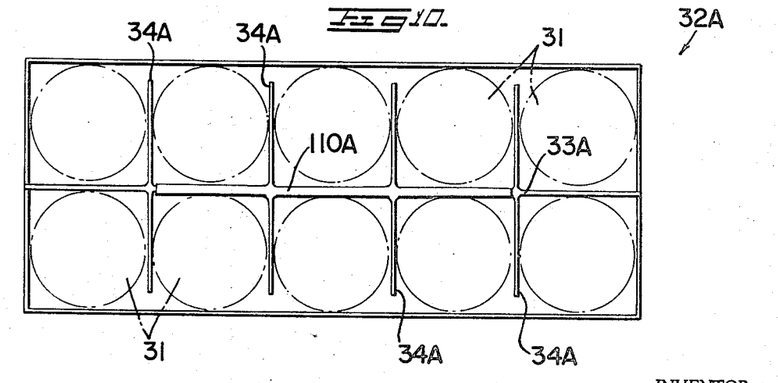
FIGURE 10 is a view on the line 10—10 of FIGURE 9.
Figure 11:
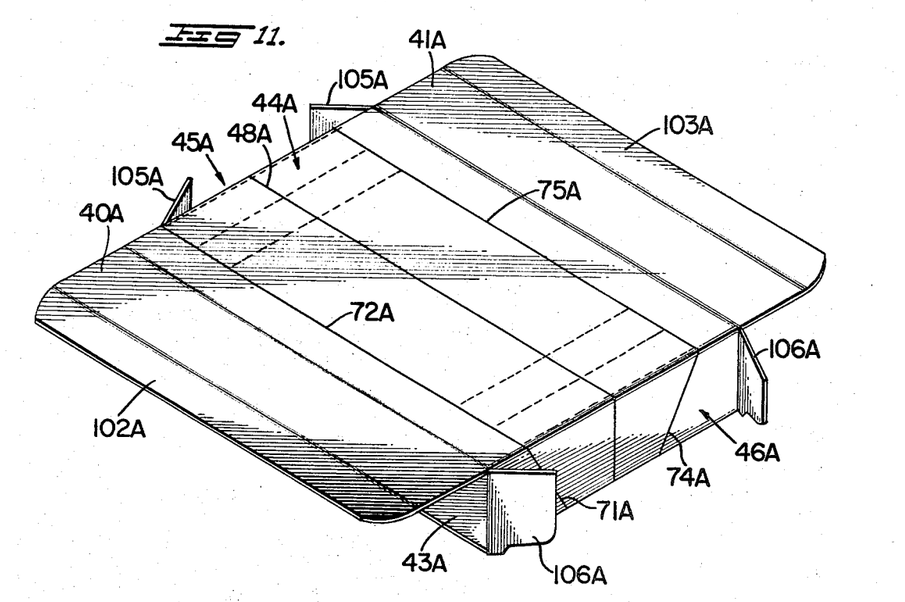
Figure 12:
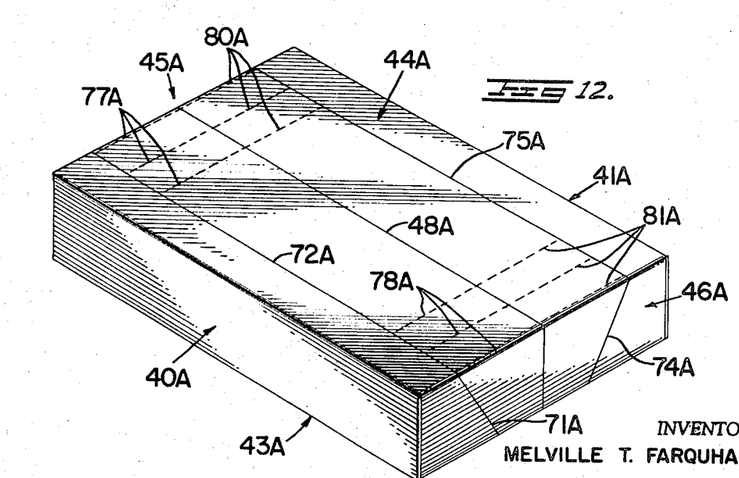
FIGURE 12 is a view similar to FIGURE 4 of the drawings for the carton of FIGURE 11.

Another exemplary embodiment of this invention is illustrated in FIGURES 9–17 of the drawings. In the embodiment of FIGURES 9–17 the particular container means or package as shown in FIGURE 9 is similar to the container means 30 and the partitioned container means or carton used within the package of FIGURE 9 is very similar to carton 32 used in container means 30; therefore, the container means or package and carton of this latter embodiment of the invention will be designated by the numerals 30A and 32A respectively and parts of container means 30A and carton 32A which are very similar to corresponding parts of container means 30 and carton 32 will be designated by the same numeral as previously followed by the letter designation A and not described again in detail. Only those component parts which are different from corresponding parts in carton 30 will be designated by a new numeral also followed by the letter designation A and described in detail.

Figures 13, 14, 15:
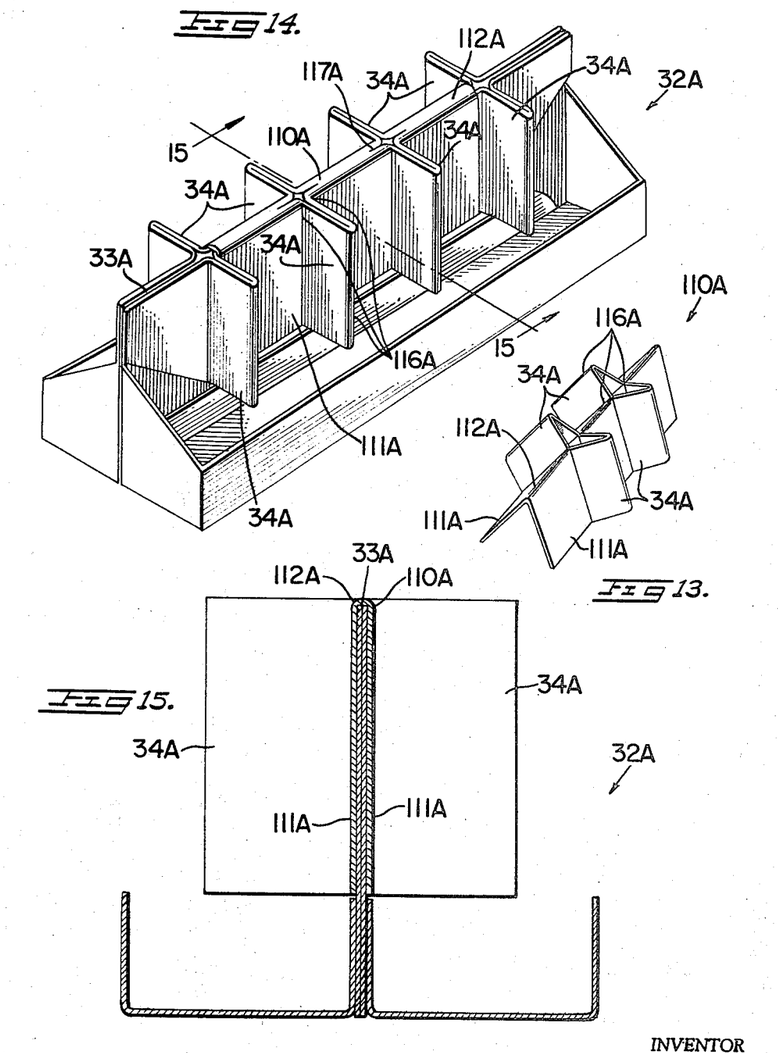
FIGURE 13 is a perspective view illustrating a substantially U-shaped partition means adapted to be used with the carton of FIGURE 12 after suitably folding such carton.
FIGURE 14 is a perspective view similar to FIGURE 7 wherein the carton of FIGURE 12 has been folded through a series of steps similar to the step illustrated in FIGURES 5 and 6 and the partition means of FIGURE 13 has been installed in position.
FIGURE 15 is a sectional view on the line 15—15 of FIGURE 14.
Figure 16:
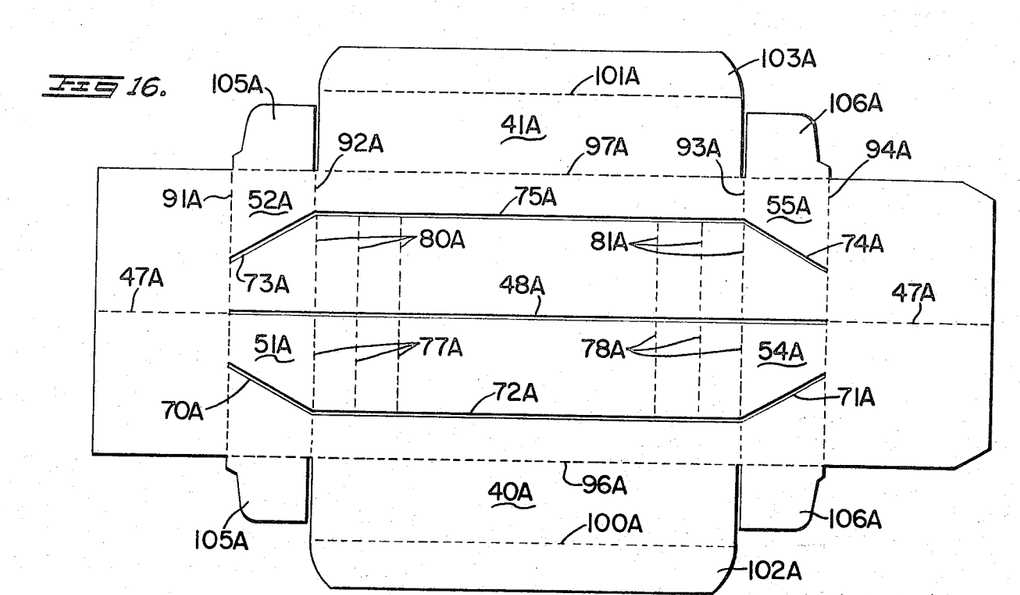
FIGURE 16 is a plan view of the blank used to make the carton of FIGURE 11.

Basically, the carton of container means 30A has been modified dimensionally to accommodate ten bottles 31 and utilizes a carton 32A which is practically identical in construction with carton 32, as will be apparent from the drawings, with the exception that there is considerable space between the pair of partitions 34A extending from each side of central partition 33A so as to enable the placing in position of an additional spacer means or partition means designated by the numeral 110A and having a substantially inverted U-shaped configuration as seen in FIGURE 13 of the drawings. Partition means 110A has a pair of individual partitions 34A extending outwardly from each opposite side of its parallel leg portions which comprise the U-shaped configuration and such partitions receive a bottle 31 on each side thereof.

Additional partition means 110A is supported over the central part of partition 33A of carton 32A as seen in FIGURE 14 so that its parallel leg portions, each designated by the numeral 111A, extend on opposite sides of partition 33A and the base portion 112A of such inverted U-shaped partition means 110A is supported against the top edge of partition 33A.

Figure 17:
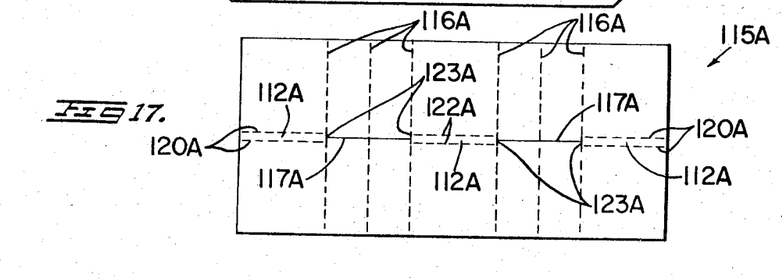
FIGURE 17 is a plan view of the blank used to make the partition means of FIGURE 13.

Partition means 110A may be made in any suitable manner and made from any suitable foldable material it is preferably made from the single piece blank 115A illustrated in FIGURE 17 of the drawings. Blank 115A may be of the same type of basic construction as described in detail in connection with blank 90.

Blank 115A is of rectangular peripheral outline and has two sets of three spaced apart score lines extending in one direction thereacross and each designated by the same numeral 116A. Each set of three score lines is arranged adjacent an associated end of blank 115A in a symmetrical pattern.

In addition, blank 115A has a pair of spaced apart rectilinear cuts lying essentially on the same axis and each designated by the numeral 117A. Cuts 117A, in effect, bisect score lines 116A and extend between the outer ones of such score lines in each set.

Score means shown as a pair of parallel spaced apart score lines each designated by the numeral 120A is provided so as to extend from the outer end of each cut 117A to the adjacent edge of blank 115A. A pair of parallel spaced apart score lines each designated by the numeral 122A is also provided and arranged between the inner ends of cuts 117A. The score lines 120A and 122A on each side of a central axis coinciding with cuts 117A are arranged on a common axis and the perpendicular spacing between such score lines on opposite sides of such central axis defines the base portion 112A of U-shaped partition means 110A upon folding blank 115A to define partition 110A.

Perpendicular cut means designated by the numeral 123A in each instance is provided between each pair of parallel score lines 120A and 122A so that each cut 123A coincides substantially with the outer score line 116A in each set of three parallel score lines. Cuts 123A enable blank 115A to be more easily folded in defining partition means 110A.

Score lines 120A and 122A together with cuts 117A and 123A enable rectangular blank 115A to be folded so as to define the substantially U-shaped configuration of partition means 110A as previously mentioned. The substantially U-shaped partition means 110A is then hung over central vertical partition 33A in a saddle-like manner as illustrated in FIGURES 14 and 15 of the drawings while score lines 116A enable portions of blank 115A to be folded to define double thickness partitions also designated by the numeral 34A because of their basic similarity to partitions 34A defined by folding carton 32A into position. As seen particularly in FIGURES 13 and 14 upon folding blank 115A about score lines 120A and 122A and cuts 117A a pair of leg portions 111A of partition 110A is defined. Each leg 111A extends substantially coplanar with an associated side of central partition 33A. In addition, it will be seen that upon folding blank 115A in the required manner score lines 116A enable the provision of partitions 34A which extend outwardly an equal amount from an associated leg portion 111A.

The various wall portions of carton 32A and hence of container means 30A are practically identical (except for length) to container 30 and its partitioned carton 32 and carton 32A merely utilizes additional partition means to enable more bottles to be carried in a partitioned manner.

In this example of the invention it will be seen that separate partition means 110A provides two partitions 34A extending from opposite sides thereof to enable ten bottles to be carried within container means 30A. However, it will be appreciated that the particular partition means arranged between the two partitions 34A on each side of central partition 33A may have only one partition 34A extending from each side thereof or three or more partitions extending from each side as desired and depending on the number of bottles or other articles which are to be carried within container means 32A.

Identical size bottles 31 are carried within both exemplary container means 30 and 30A; however, it will be appreciated that it is not necessary that the bottles or other articles to be carried within container means 30 and 30A be of the same size. For example, it may be required in some applications of this invention to package articles that need to be supported in spaced apart relation in a similar manner as bottles 31 yet such articles may be of different sizes and/or configurations. Nevertheless, the improved container means of this invention may still be utilized effectively.

Terms such as "bottom," "top," "bottom wall," "top wall," "end wall," "side wall," "upwardly," "downwardly," and the like, have been utilized in this disclosure of the invention merely to define the positions of the various walls of the container means and associated cuts and scores as illustrated in the drawings and it is to be understood that such terms should not be considered as limiting the scope of this invention in any way.

Thus, it is seen that an improved partitioned container means has been provided which is of simple and economical construction.

Further, it is seen that an improved method has been provided which utilizes a simple suitably cut and scored carton having the general shape of a parallelepiped which is folded in a predetermined series of steps to provide the improved carton of this invention.

This invention also provides simple blanks for making such improved container means, or the like.

I claim:

1. An easily erected partitioned container means having, a central vertical partition extending the full length thereof, a plurality of transverse partition means extending transverse to said central partition in spaced apart relation and supported solely by said central partition, said transverse partition means comprising first and second transverse partition means extending transverse to opposite vertical surface means of said central partition and each having a plurality of transverse partitions, and suspended partition means of substantially U-shaped configuration supported in inverted relation on said central partition with its parallel legs extending along opposite sides of said central partition and each of said parallel legs having additional partition means extending outwardly therefrom.

2. Container means as set forth in claim 1 and further comprising a plurality of articles supported within said container means and shrinkable plastic means shrunk in position about said articles and said container means to thereby hold said articles in position within said container means.

3. An easily erected partitioned container means having a central vertical partition extending the full length and height thereof, said central partition having a substantially double thickness throughout defined by overlapping substantially rectangular surface means upon itself to define first and second vertical surface means, and a plurality of transverse partition means extending transverse to said central partition in spaced apart relation and supported solely by said central partition, said transverse partition means including first and second transverse partition means extending transverse to said first and second vertical surface means respectively, each of said first and second transverse partition means having a plurality of transverse partitions formed therein as a single structural unit and said first and second transverse partition means are foldably connected at their opposite side edges to associated side edges of said first and second vertical surface means, each of said first and second transverse partition means having portions thereof lying substantially coplanar with associated vertical surface means and each of said transverse partitions being of double thickness and extending outwardly from adjoining coplanar portions.

4. Container means as set forth in claim 3 and further comprising a plurality of articles supported within said container means and shrinkable plastic means shrunk in position about said articles and container means to thereby hold said articles in position within said container means.

5. An easily erected partitioned container means having a central vertical partition extending the full length and height thereof, said central partition having a substantially double thickness throughout defined by overlapping substantially rectangular surface means upon itself to define first and second vertical surface means, and a plurality of transverse partition means extending transverse to said central partition in spaced apart relation and supported solely by said central partition, said transverse partition means including first and second transverse partition means extending transverse to said first and second vertical surface means respectively, each of said first and second transverse partition means having a plurality of transverse partitions formed therein as a single structural unit, said plurality of transverse partitions comprising each of said first and second transverse partition means comprises a pair of spaced apart partitions in each of said first and second transverse partition means each being spaced inwardly from an associated end edge of said central partition, and said container means further comprises suspended partition means of substantially U-shaped configuration supported in inverted relation with its parallel legs extending along opposite sides of said central partition and each of said parallel legs having at least an additional partition extending outwardly therefrom, whereby said container means is adapted to carry a plurality of articles as determined by the number of compartment means defined by said pairs of spaced apart partitions and additional partitions.

6. Container means as set forth in claim 5 in which each partition of said pair of transverse partitions in said first partition means is arranged so that it lies substantially in the same vertical plane as a corresponding partition of said pair of transverse partitions in said second partition means, said suspended partition means has an equal number of additional partitions extending outwardly from each of said parallel legs, and said additional partitions extending from each leg being arranged between an associated pair of transverse partitions, whereby said container means has a plurality of compartment means defined therein equal to six plus the total number of additional partitions extending from both sides of said suspended partition means.

7. A method of making partitioned container means comprising the method steps of, forming a carton having the general shape of a parallelepiped, providing cut means in said carton to enable folding said carton substantially in half about a fold line in one of its walls to thereby form a central double thickness vertical partition arranged beneath said fold line and a pair of adjoining tubular units having open top wall means, providing cut and score means in wall means of a tubular unit to define transverse partition means, and folding said wall means so that said transverse partition means extends transverse to said central partition in spaced apart relation while being supported solely by said central partition.

8. The method as set forth in claim 7 in which said step of providing cut and score means in wall means of a tubular unit comprises providing said cut and score means in each tubular unit to define first transverse partition means in one tubular unit and second transverse partition means in the other tubular unit, and said folding step comprises folding said wall means of each tubular unit to define a plurality of transverse partitions extending from an associated partition means within each tubular unit and each being supported solely by an associated vertical portion of said central partition.

9. The method as set forth in claim 8 comprising the further steps of, providing a plurality of articles to be carried within said container means, placing said articles within compartment means defined by said partitions and adjoining portions of said container means, providing overwrapping material means, and overwrapping said container means and articles with said overwrapping material means.

10. The method as set forth in claim 8 in which said step of forming a carton comprises forming said carton from a single sheet of foldable material.

11. The method as set forth in claim 10 comprising the further steps of providing a plurality of articles to be carried within said container means, placing said articles within compartment means defined by said partitions and adjoining portions of said container means, providing heat shrinkable plastic overwrapping material means, overwrapping said container means and articles with said heat shrinkable plastic overwrapping material means, and heat shrinking said plastic material around said container means and articles so as to define a compact high strength package construction.

12. The method as set forth in claim 8 in which said step of providing cut and score means in wall means of each tubular unit to define first and second transverse partition means comprises the steps of, providing horizontal cut means in outside wall means of each tubular unit which is arranged parallel to said central partition, said horizontal cut means extending the full length of said outside wall means, providing transverse cut means in each adjoining wall means adjoining said outside wall means and extending the full width of each adjoining wall means between an associated end of said horizontal cut means and said central partition, and providing a plurality of sets of vertical spaced apart score lines in said outside wall means comprised of three vertical score lines in each set with each score line extending vertically from the top edge of its outside wall means to its associated horizontal cut means, whereby upon folding said wall means during said folding step said outer score lines of each set are moved adjoining each other so that portions of said outside wall means extending therebetween define a double thickness partition with the central score line of each set defining the outer edge of said double thickness partition.

13. The method as set forth in claim 8 comprising the further steps of, providing additional suspended partition means of substantially U-shaped configuration, suspending said additional partition means over said central partition in inverted relation with its parallel legs extending along opposite sides of said central partition and each of said parallel legs having at least an additional partition extending outwardly therefrom, whereby said container means is adapted to carry a plurality of articles as determined by the number of compartment means defined by said plurality of partitions and additional partitions.

14. A blank being cut and scored and adapted to be assembled to define a resulting easily erected partitioned container means, said blank having a central portion adapted to be folded to define a central vertical partition for said resulting container means which extends the full length and height of said resulting container means, said central partition having a substantially double thickness throughout defined by folding said central portion upon itself to define first and second vertical surface means in said resulting container means, with said blank having a plurality of transverse partition means defined therein and adapted to extend transverse to said central vertical partition of said resulting container means while being supported solely by said central partition, said transverse partition means including first and second transverse partition means extending transverse to said first and second vertical surface means respectively of said resulting container means, and each of said first and second transverse partition means has a plurality of transverse partitions formed therein as an integral structural unit.

15. The blank as set forth in claim 14 in which said plurality of transverse partitions comprising each of said first and second transverse partition means comprises a pair of spaced apart partitions each being spaced inwardly from an associated end edge of said central partition upon assemblying said resulting container means from said blank so as to define three compartment means in said resulting container means on each side of said central partition.

16. The blank as set forth in claim 15 in which each partition of said pair of transverse partitions in said first partition means is arranged so that it lies substantially in the same vertical plane as a corresponding partition of said pair of transverse partitions in said second partition means in the resulting container means, and in which said compartment means are of equal size.

17. The blank as set forth in claim 16 in which, said first and second transverse partition means are foldably connected at their opposite side edges to associated side edges of said first and second vertical surface means, each of said first and second transverse partition means has portions thereof lying substantially coplanar with associated vertical surface means, and each of said transverse partitions being of double thickness and extending outwardly from adjoining coplanar portions.

References Cited

UNITED STATES PATENTS

| | | | |
|---|---|---|---|
| 1,799,657 | 4/1931 | Tinsley | 220—113 |
| 2,563,620 | 8/1951 | Ringler | 220—113 |
| 2,645,403 | 7/1953 | Arneson | 220—113 X |
| 3,061,141 | 10/1962 | Cote | 220—113 |
| 3,246,827 | 4/1966 | Walter | 229—28 |
| 3,257,027 | 6/1966 | Weiss | 206—65 X |
| 3,283,989 | 11/1966 | De Paul | 206—65 X |

FOREIGN PATENTS 912,424  12/1962  Great Britain.

MARTHA L. RICE, Primary Examiner.

U.S. Cl. X.R.

53—30; 93—49; 229—28